United States Patent [19]
Byon

[11] Patent Number: 5,618,058
[45] Date of Patent: Apr. 8, 1997

[54] COLLAPSIBLE STEERING COLUMN APPARATUS OF A MOTOR VEHICLE

[75] Inventor: Sung-Kwang Byon, Seoul, Rep. of Korea

[73] Assignee: Daewoo Electronics Co., Ltd., Seoul, Rep. of Korea

[21] Appl. No.: 574,163

[22] Filed: Dec. 18, 1995

[30]     Foreign Application Priority Data

Mar. 22, 1995 [KR]   Rep. of Korea .......................... 95-6059

[51] Int. Cl.$^6$ ..................................................... B62D 1/11
[52] U.S. Cl. ..................................... 280/777; 74/492
[58] Field of Search ..................................... 280/775, 777; 74/492

[56]              References Cited

U.S. PATENT DOCUMENTS

| 4,674,354 | 6/1987 | Brand | 74/492 |
| 5,071,163 | 12/1991 | Heinrichs et al. | 280/775 |
| 5,193,848 | 3/1993 | Faulstroh | 280/775 |
| 5,332,260 | 7/1994 | Heinrichs et al. | 280/775 |
| 5,378,021 | 1/1995 | Yamaguchi et al. | 280/777 |

Primary Examiner—Kenneth R. Rice
Attorney, Agent, or Firm—Beveridge, DeGrandi, Weilacher & Young LLP

[57]               ABSTRACT

A collapsible steering column apparatus of a motor vehicle including a steering wheel made of a material whose stiffness is increased while the inside thereof is filled with gas and whose elasticity is increased while the gas is exhausted, and a steering column part connected to the steering wheel for decreasing a secondary shock when the driver strikes the steering wheel at the time of a collision of the vehicle while slidably moving lengthwise by the gas pressure varying depending on the control of a controller. The steering column part has a plurality of hollow steering columns. The compressed gas is supplied to the inside of the steering column part and exhausted therefrom by the control of the controller. If the collision of the vehicle is detected, since the steering column is collapsible lengthwise, the distance between the driver and the steering wheel becomes long. The elasticity of the steering wheel from which the internal gas is exhausted, thereby functioning as a kind of an air-cushion for the driver.

9 Claims, 4 Drawing Sheets

COLLAPSIBLE STEERING COLUMN APPARATUS OF A MOTOR VEHICLE

BACKGROUND OF THE INVENTION

1. Field of the Invention

The present invention relates to a steering column apparatus of a motor vehicle, and more particularly, to a collapsible steering column apparatus which can absorb and reduce the shock applied to a driver by a steering wheel at the time of a motor vehicle collision.

2. Description of the Prior Art

FIG. 1 is an exploded perspective view of a conventional steering wheel 10 and steering column 20. Steering wheel 10 includes a rim 12 gripped by the driver's hand for steering, a hub 14 for transmitting the rotary force of steering wheel 10 to steering column 20, and a spoke 16 for connecting rim 12 and hub 14. Spoke 16 and rim 12 are internally reinforced by steel or light alloy seam and are externally plasticized with synthetic resin.

Also, in order to reduce the damage against the driver due to the collision of steering wheel 10 and the driver when a motor vehicle collides, hub 14 and spoke 15 are embraced by synthetic resin to widen the contact area with the driver's body.

A vehicle collision involves a so-called primary shock wherein the vehicle collides with another vehicle or the like and a so-called secondary shock subsequently induced wherein the driver strikes against a steering wheel. The secondary shock is applied to the driver's chest or face, the driver is often killed by his neck being broken in the collision of the motor vehicle. Thus, an impact that the driver undergoes upon this secondary shock should be minimized for protecting the life of the driver. A general practice which meets this purpose is that of a so-called collapsible steering shaft which is constructed to reduce the overall length thereof when undergoing a strong impact.

To attain this a collapsible steering column has been developed. A known conventional collapsible steering column apparatus for reducing the secondary shock generated in the collision of the motor vehicle is disclosed in, e.g., U.S. Pat. No. 5,378,021 (Japanese Utility Model Application No. 4-21980) granted on Jan. 3, 1995 to Mikio Yamaguchi et al, which is shown in FIGS. 2 through 4.

FIG. 2 is a view for illustrating Yamaguchi's steering column apparatus 30 using an energy absorbing member 40. FIG. 3 is a sectional view taken along the line A—A in FIG. 2. FIG. 4 is a view illustrating energy absorbing member 40 used in FIGS. 2 and 3.

As shown in FIGS. 2 and 3, Yamaguchi's collapsible steering column apparatus 30 includes a steering column 22 into which a steering shaft 26 and energy absorbing member 40 are inserted. A steering wheel 10 is fixed to the front end of steering shaft 26. A rear end 42 of energy absorbing member 40 is fixed to the outer peripheral surface of steering column 22 and a front end 46 thereof is connected to a support bracket 24 fixed to a vehicle body 52 by a bolt 48 and a nut 50.

Energy absorbing member 40 is manufactured by punching out a sheet of metal plate and has a laterally undulating configuration 44.

If a force (F) of the direction shown in FIG. 2 is applied to steering column 22 by the secondary shock generated at the time of collision, steering column 22 moves lengthwise.

At this time, energy absorbing member 40 whose rear end 42 is supported to the outer peripheral surface of steering column 22 and whose from end 46 is connected to support bracket 24, is collapsed lengthwise and is elongated laterally by the force (F), as shown in FIG. 4 (the upward and downward arrow directions).

The force necessary for arising the elongation of energy absorbing member 40 is not greatly increased. Ultimately, the forward displacement of steering column 22 is smoothly started. While the forward displacement of steering column 22 progresses, energy absorbing member 40 is collapsed lengthwise and is elongated laterally to then absorb the force (F).

Further, since energy absorbing member 40 has undulating configuration 44, as shown in FIG. 4, the lateral elongation of undulating configuration 44 of energy absorbing member 40 decreases progressively. The force necessary for causing the elongation of energy absorbing member 40 is comparatively small at the initial stage but the force necessary for causing further lateral elongation gradually should be larger than that of the initial stage along with a progression of the elongation of energy absorbing member 40. Therefore the displacement of energy absorbing member 40 decreases gradually so that the forward movement of steering column 22 becomes small gradually.

As described above, Yamaguchi's collapsible steering column apparatus 30 absorbs the impulsive force of the vehicle by energy absorbing member 40 to reduce the shock transmitted to the driver.

However, Yamaguchi's collapsible steering column apparatus 30 cannot prevent the movement of steering column 22 toward the driver. Since energy absorbing member 40 is plastically deformed, it is not reusable and should be replaced with a new one after its use. Also, since steering wheel 10 is made of steel, when the driver's body strikes against steering wheel 10 at the time of collision, the driver's body may receive a serious shock.

SUMMARY OF THE INVENTION

There, it is an object of the present invention to provide a collapsible steering column apparatus which prevents a steering column from moving toward a driver in a vehicle collision and can minimize the shock applied to the driver when the driver collides with the steering wheel.

In order to achieve the above object of the present invention, there is provided a collapsible steering column apparatus of a motor vehicle, which comprises:

a steering wheel having a hollow portion therein;

a steering column part including at least one steering column which is slidably moved lengthwise and having a gas filled therein, said steering wheel being fixed to said steering column part; and controlling means for supplying the gas to inside of said steering column part and said steering wheel, for maintaining an internal pressure of said steering column part and said steering wheel at a predetermined level, for alarming when the internal pressure is lowered below the predetermined level and exhausting the gas from the insides by detecting a collision of vehicle.

The steering wheel is stiff enough to endure over 30 atmospheric pressure when the hollow portion is filled with the gas. The steering wheel is comprised of a material which is elastic enough to be collapsible when the gas is exhausted.

The steering column part includes a first steering column having an upper end of which the steering wheel is fixed, a second steering column slidably engaged with the first steering column, a third and a fourth steering columns slidably engaged with the second steering column and a bellows fixed on outer peripheral surfaces of the first and second steering columns.

The controlling means includes a collision sensor for detecting a collision, a pressure sensor for detecting the internal pressure of the steering column part, a reservoir for compressing and storing gas, a first pipe whose one end is connected to the reservoir, a second pipe whose one end is connected through the steering column part, a solenoid valve connected to the first and second pipes for supplying/exhausting the gas to/from the steering column part and maintaining the internal pressure of the steering column part, a controller for controlling the internal pressure of the steering column part by means of controlling the solenoid valve according to signals from the collision sensor and the pressure sensor, and an alarm lamp being operated by the alarm signal for alarming a drive.

Collapsible steering column apparatus according to the present invention utilizes as the gas the compressed air or nitrogen.

When the vehicle collides with something, the controller receives a signal from the collision sensor and controls the solenoid valve so as to exhaust the internal gas of the steering column part. As the gas is exhausted, the pressure of the steering column part is decreased and the first and second steering columns are lowered lengthwise.

Therefore, the distance between the driver and the steering wheel becomes longer, which makes it difficult for the driver to strike the steering wheel. Also, the internal gas of the steering wheel is exhausted at the time of the collision so that the steering wheel becomes cushy. Therefore, even when the driver strikes against the steering wheel, the damage applied to the driver is minimized, thereby protecting the driver from the secondary shock.

The collapsible steering column apparatus according to the present invention is constructed such that the steering column is collapsed along its length to make the distance between the steering wheel and the driver long. Also, the internal gas pressure of the steering wheel is lowered to increase the elasticity, which functions as a kind of an energy absorbing member.

BRIEF DESCRIPTION OF THE DRAWINGS

The above objects and advantages of the present invention will become more apparent by describing in detail a preferred embodiment thereof with reference to the attached drawings in which.

Figure 1:
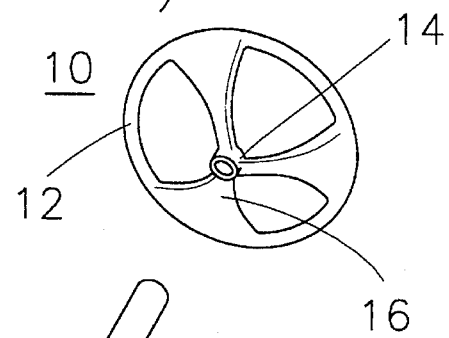
FIG. 1 is an exploded perspective view of a conventional steering column and steering wheel.
Figure 1:
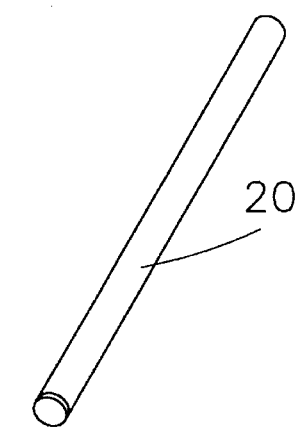
Figure 2:
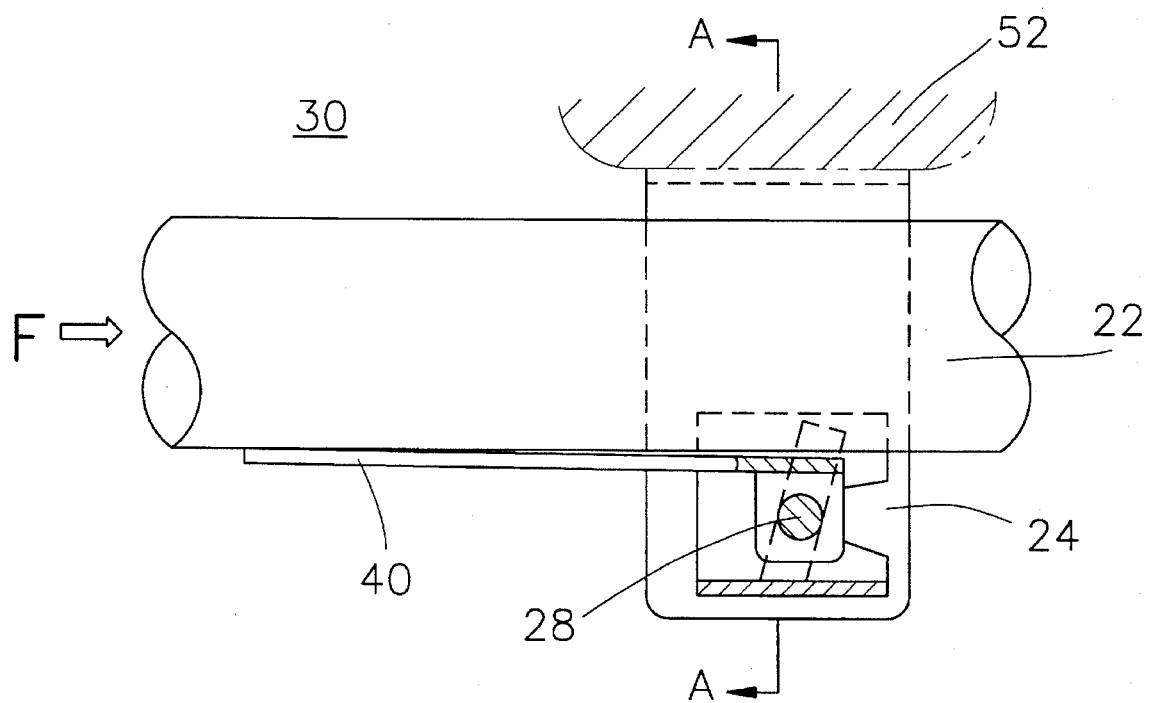
Figure 3:
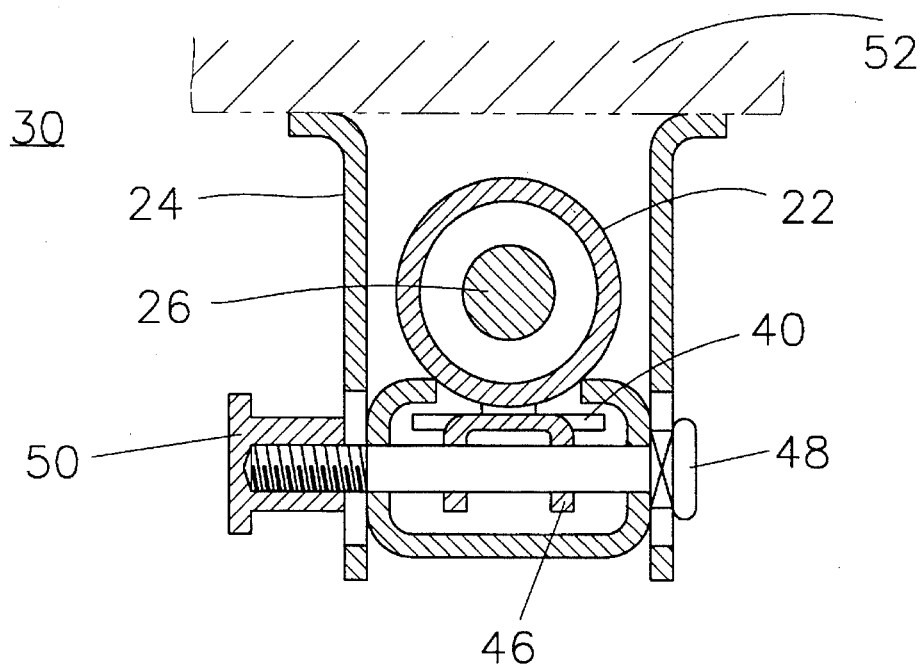
Figure 4:
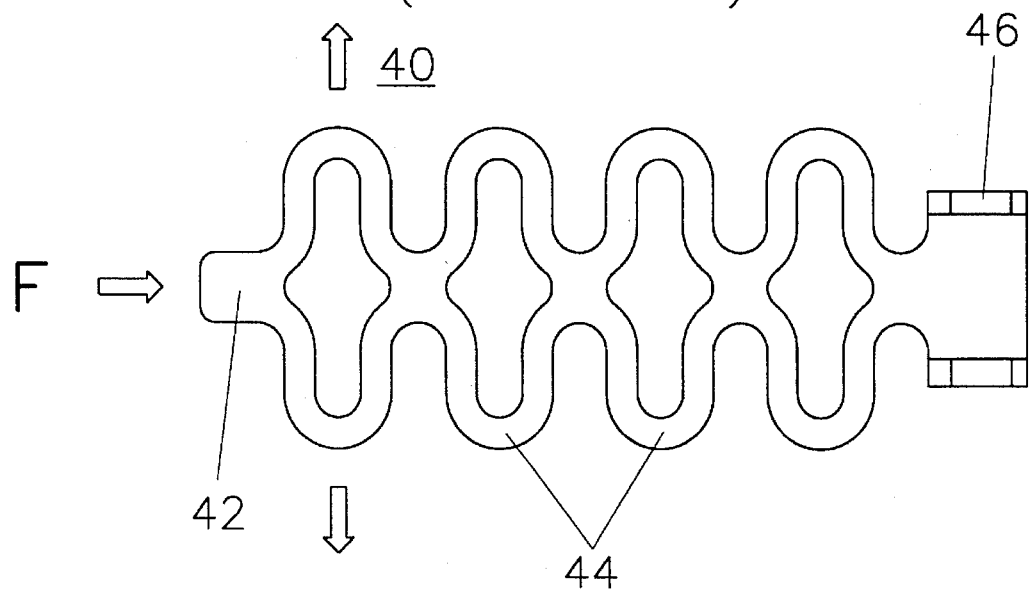
Figure 5:
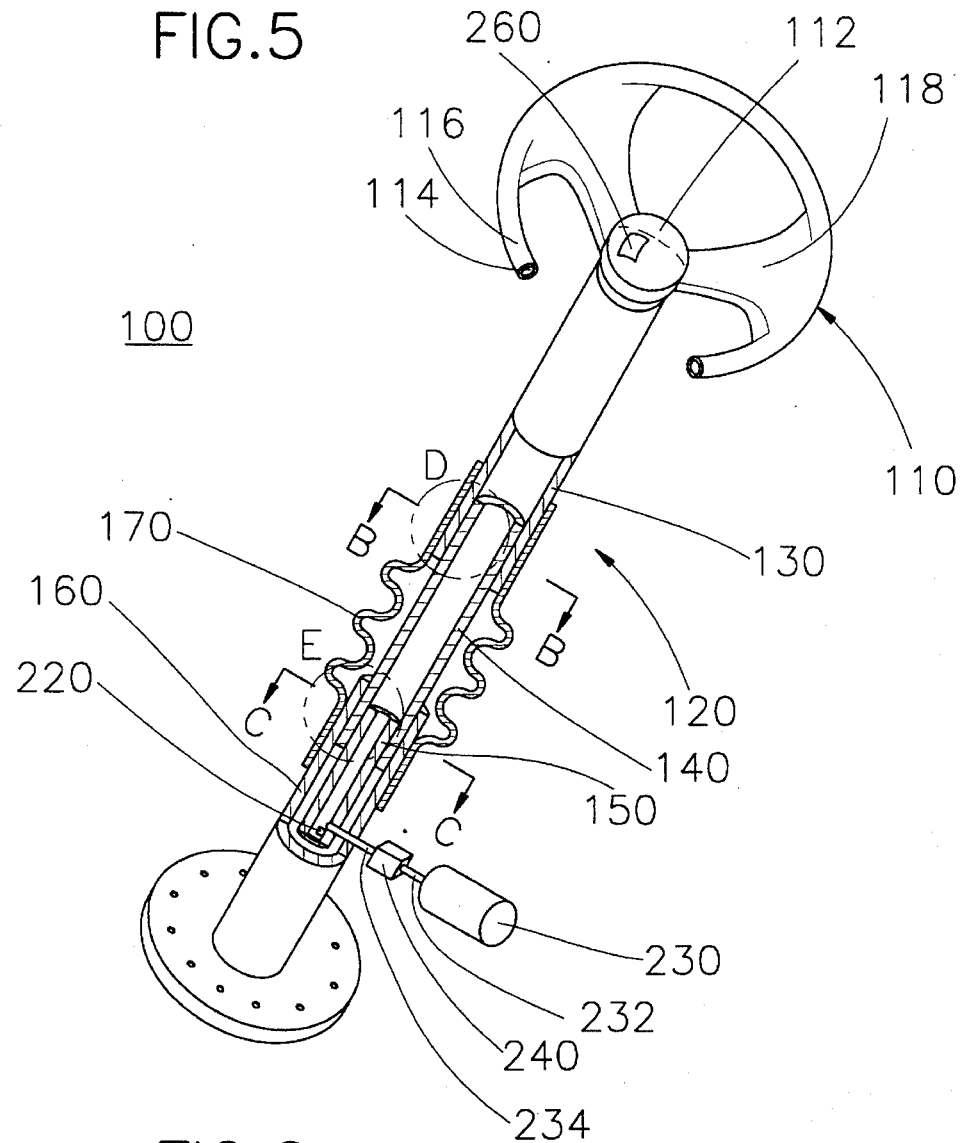
Figure 6:
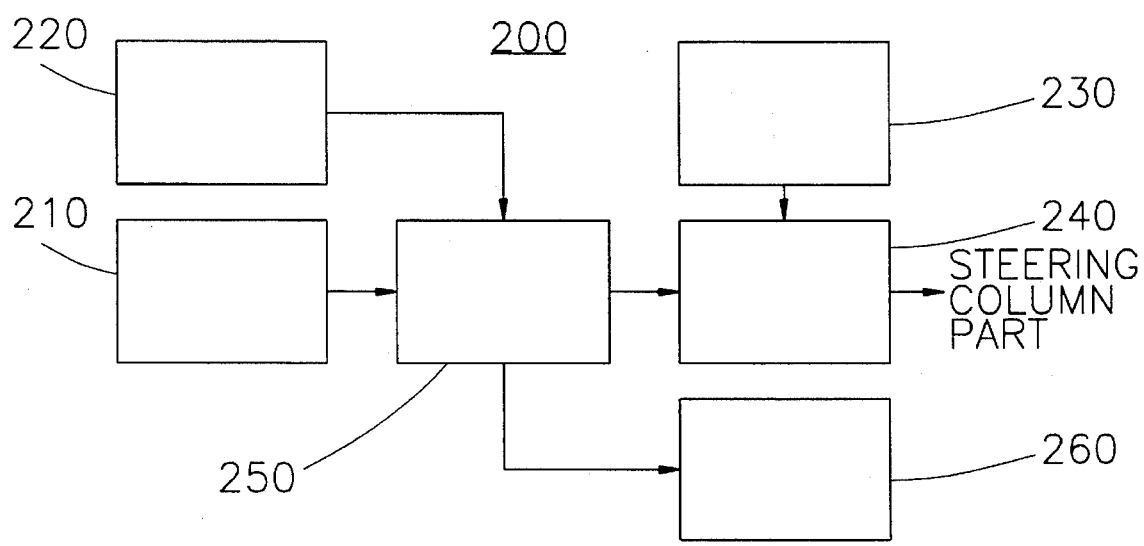
Figure 7:
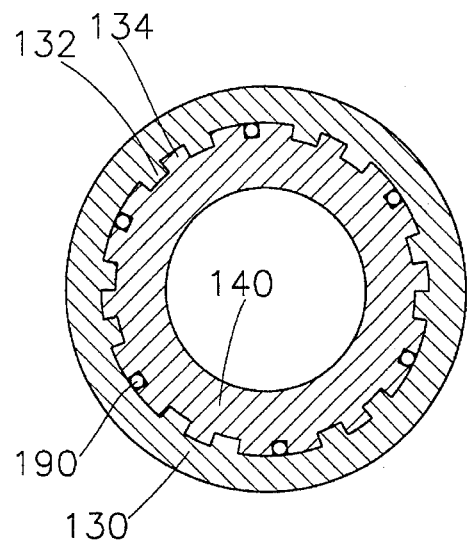
Figure 8:
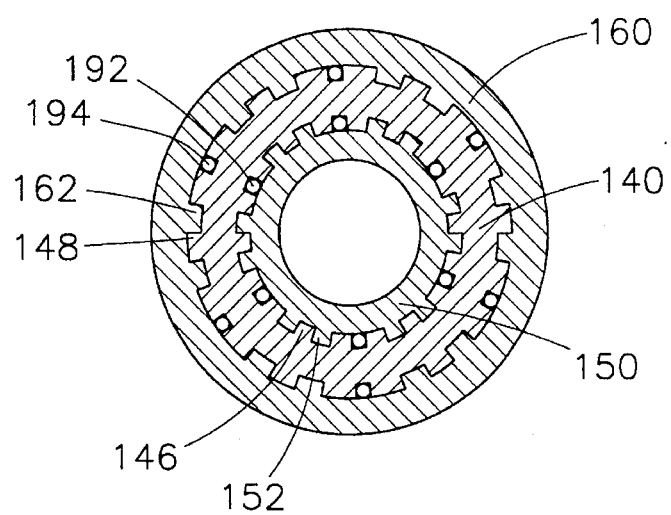
Figure 9:
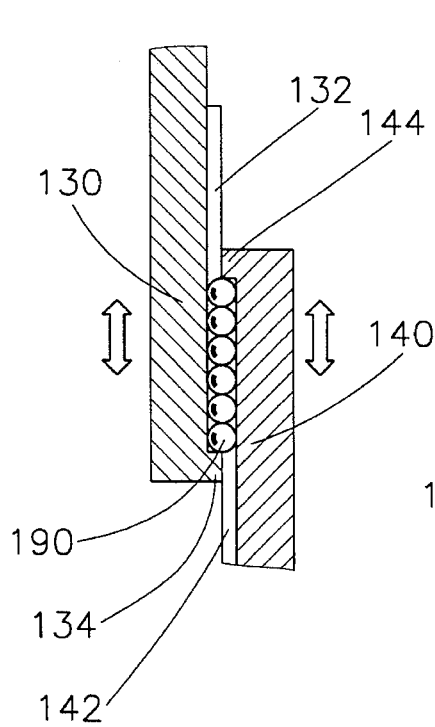

FIG. is a view illustrating a conventional steering column apparatus using an energy absorbing member;

FIG. 3 is a sectional view taken along the line A—A in FIG. 2;

FIG. 4 is a view illustrating the energy absorbing member used in FIGS. 2 and 3;

FIG. 5 is a perspective view for showing a collapsible steering column apparatus according to an embodiment of the present invention;

FIG. 6 is a block diagram for showing a controller of the collapsible steering column apparatus as shown in FIG. 5;

FIG. 7 is a sectional view taken along the line B—B in FIG. 5;

FIG. 8 is a sectional view taken along the line C—C in FIG. 5;

FIG. 9 is an enlarged sectional view of a portion D shown in FIG. 5; and

Figure 10:
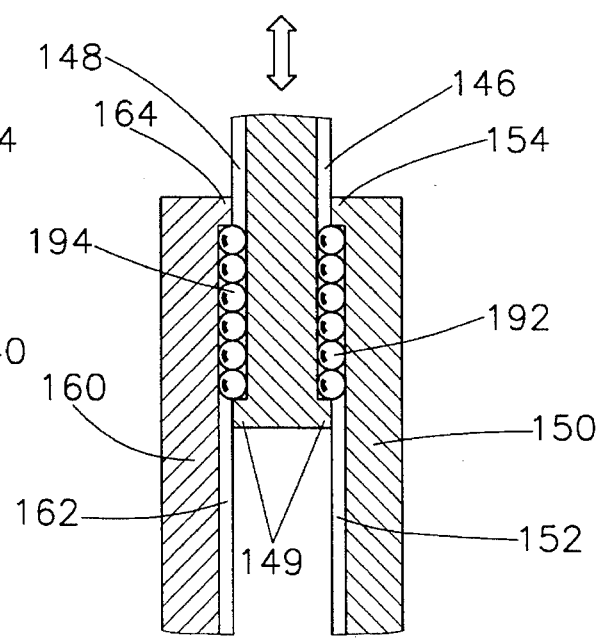

FIG. 10 is an enlarged sectional view of a portion E shown in FIG. 5

DETAILED DESCRIPTION OF THE INVENTION

Hereinafter, the present invention will be described in detail referring to the accompanying drawings.

FIG. 5 is a perspective view for showing a collapsible steering column apparatus 100 according to an embodiment of the present invention and FIG. 6 is a block diagram for showing a controlling part 200 of collapsible steering column apparatus 100 as shown in FIG. 5. As shown in FIGS. 5 and 6, collapsible steering column apparatus 100 according to a preferred embodiment of the present invention includes a steering wheel 110, a steering column part 120 having a plurality of hollow steering columns, e.g., first, second, third and fourth steering columns 130, 140, 150 and 160 to which steering wheel 110 is connected.

Controlling part 200 supplies gas into steering column part 120 to allow the hollow portion of steering column part 120 and steering wheel 110 to maintain a constant pressure. Also, controlling part 200 senses the collision and exhausts the internal gas of steering wheel 110 and steering column part 120 to lower the pressure.

Steering column part 120 includes a first steering column 130 to which steering wheel 110 is fixed, a second steering column 140 whose outer peripheral surface in one end is sliably connected to the inner peripheral surface of first steering column 130, a third steering column 150 which is slidably connected to the inner peripheral surface in the other end of second steering column 140, and a fourth steering column 160 which is slidably connected to the outer peripheral surface in the other end of second steering column 140. An air-tight state is maintained on each outer peripheral surface of first steering column 130 and fourth steering column 160 by a bellows 170. First, second, third and fourth steering columns 130, 140, 150 and 160 are all formed so as to have the hollow shafts.

FIGS. 7 through 10 are sectional views for illustrating a state that first steering column 130 and second steering column 140 are connected to each other, and a state that second steering column 140 is connected to third and fourth steering column 150 and 160.

A first spline 132 is formed on the inner peripheral surface of first steering column 130, slidably connected to second steering column 140 by a predetermined length, and a first flange 134 is formed at the tip of first spline 132.

A second spline 142 is formed on the outer peripheral surface of the upper portion of second steering column 140 by a predetermined length, and a second flange 144 is formed in the tip of second spline 142. Second spline 142 is slidably connected to first spline 132 of first steering column 130. Also, a third spline 146 is formed on the inner peripheral surface of the lower portion of second steering column 140 by a predetermined length, and a fourth spline 148 is formed on the outer peripheral surface thereof by a predetermined length. A third flange 149 is formed at tips of third and fourth splines 146 and 148.

A fifth spline 152 is formed on the outer peripheral surface of the upper portion of third steering column 150 by a predetermined length, and a fourth flange 154 is formed at the tip of fifth spline 152. Fifth spline 152 of third steering column 150 is slidably connected to third spline 146 of second steering column 140.

A sixth spline 162 is formed on the inner peripheral surface of the upper portion of fourth steering column 160 by a predetermined length, and a fifth flange 164 is formed at the tip of sixth spline 162. Sixth spline 162 is engaged with fourth spline 146 of third steering column 150 so that fourth steering column 160 is slidably connected to third steering column 150.

First and second steering column 130 and 140 as above are formed so as to have a shape of an internally-hollow shaft. Third and fourth steering column 150 and 160 are formed so as to have a shape of a internally-hollow shaft whose lower end is closed and whose upper end is opened.

As shown in FIGS. 7 and 9, a plurality of first balls 190 are inserted between first spline 132 of first steering column 130 and second spline 142 of second steering column 140. First balls 190 are inserted between first spline 132 and second spline 142 at a predetermined distance in the circumferential direction, as shown in FIG. 7, and their movements are limited by first and second flanges 134 and 144.

A plurality of second balls 192 are inserted between third spline 146 of second steering column 140 and fifth spline 152 of third steering column 150 at a predetermined distance in the circumferential distance, as shown in FIGS. 8 and 10, and the movements of second balls 192 are limited by third and fourth flanges 149 and 154.

Also, a plurality of third balls 194 are inserted between fourth spline 148 of second steering column 140 and sixth spline 162 of fourth steering column 150 at a predetermined distance in the circumferential distance, and the movements of third balls 194 are limited by third and fifth flanges 149 and 164.

Steering wheel 110 fixed to the upper end of first steering column 130 includes a rim 116 gripped by the driver's hands, a hub 112 for fixing steering wheel 110 on first steering column 130 and a spoke 118 for connected hub 112 to rim 116. Rim 116, hub 112 and spoke 118 have an internally formed hollow portion 114. Hollow portion 114 of steering wheel 110 is connected with the hollow portion of steering column part 120 to then be internally filled with gas.

Steering wheel 110 is stiff enough to endure against over 30 atmospheric pressure when filled with gas and is made of a material such as polyurethane, neoprene and nylon that makes steering wheel 110 collapsible if the internal pressure is decreased, thereby recovering the elasticity to become cushiony. The material of steering wheel 110 has an allowable stress in the ranged of 30 PSI to 100 PSI.

A controlling part 200 includes a collision sensor 210 for detecting the collision of the vehicle to generate a collision signal (CRASH), a pressure sensor 220 for detecting the pressure of the gas in steering column part 120 to generate a pressure signal (PRESS), a reservoir 230 for storing the compressed gas, a solenoid valve 240 for supplying the compressed gas to the steering column part 120 and for exhausting the gas in steering column part 120 to the atmosphere, a controller 250 for receiving collision signal (CRASH) and pressure signal (PRESS) from collision sensor 210 and pressure sensor 220, respectively, and for controlling solenoid valve 240 to adjust the internal pressure of steering column part 120 and to generate an alarm signal (ALRAM), and an alarm lamp 260 for receiving alarm signal (ALARM) from controller 250 to alarm.

Collision sensor 210 is installed in front of the vehicle or in front of steering column part 120 and generates the collision signal (CRASH). Pressure sensor 220 is installed in the inner peripheral surface of third steering column 150 and detects the internal pressure of steering column part 120 to generate pressure signal (PRESS).

Reservoir 230 and solenoid valve 240 are connected to each other by a first pipe 232. One end of a second pipe 234 is connected to solenoid valve 230 and the other end thereof is connected to the inner peripheral surface of third steering column 150 via third and fourth steering columns 150 and 160. The compressed air or compressed nitrogen gas is stored in reservoir 230.

Alarm lamp 260 is installed in steering wheel 110 or meter plate (not shown). If the internal pressure of steering column part 120 is lowered below a predetermined value (preferably 30 atmospheric pressure), alarm lamp 260 alarms this situation to the driver.

Hereinbelow the operation and effect of aforementioned collapsible steering column apparatus 100 of a vehicle according to preferred embodiment of the present invention will be described.

First, when steering column part 120 is internally in the atmospheric state, pressure sensor 220 generates pressure signal (PRESS) to transmit the same to controller 250. At this time, controller 250 having received the pressure signal controls solenoid valve 230 to be opened. Finally, the air or nitrogen gas compressed and stored in the reservoir 240 flows into steering column part 120 via first pipe 232, solenoid 230 and second pipe 234.

If the gas flows toward the internal of steering column part 120, the pressure thereof is increased, and first and second steering columns 130 and 140 move respectively in the lengthwise direction thereof. At this time, the gas also flows toward hollow portion 114 of steering wheel 110 through first steering column 130 to cause a progressive increase in stiffness.

Since the movements of first balls 190 between first spline and second spline 132 and 142 are blocked by first and second flanges 134 and 144, first steering column 130 which has slided according to the increase of the internal pressure of steering column part 120, stops.

Also, since the movements of second balls 192 between third and fifth splines 146 and 152 are blocked by third and fourth flanges 149 and 154 the movement of third balls 194 between the fourth and sixth splines 148 and 162 are blocked by third and fifth flanges 149 and 164, second steering column 140 stops.

If the internal pressure of steering column part 120 is increased to a predetermined value, preferably 30 atmospheric pressure, controller 250 receives pressure signal (PRESS) from pressure sensor 220 in order to close solenoid valve 230 so that the pressure of steering column part 120 is constantly maintained.

In this manner, if the inside of steering column part 120 and steering wheel 110 is filled with gas at a predetermined pressure, steering wheel 110 is stiff enough for the driver to perform a steering operation and steering column part 120 transfers the rotary movement of steering wheel 110 to wheels of the vehicle.

If a vehicle collides with an obstacle or another vehicle during its operation, collision sensor 210 installed in front of the vehicle detects the collision of the vehicle and generates collision signal (CRASH) to transfer the same to controller 250. At this time, controller 250 having received collision signal (CRASH) from collision sensor 210 controls solenoid valve 230 to open in order to exhaust outwardly the gas filled in the inside of steering column part 120 and steering wheel 110.

If the gas of the inside of steering column part 120 and steering wheel 110 is outwardly exhausted, the internal pressure of steering column part 120 and steering wheel 110 is decreased. Then, the elasticity of steering wheel 110 is increased and first and second steering columns 130 and 140 are slidably lowered lengthwise. Finally, steering column part 120 is collapsed lengthwise and steering wheel 110 becomes cushy.

Therefore, when the driver's body strikes steering wheel 110, steering wheel 110 has the elasticity having a comparatively large value so that the driver absorbs the shock from steering wheel 110. At this time, steering column part 120 is further lowered lengthwise and absorbs the shocks due to the collision of the driver's body with steering wheel 110, thereby minimizing the driver's shock. Therefore, the driver can be protected from the secondary shock of the vehicle.

Also, the internal pressure of steering wheel 110 and steering column part 120 is decreased to a predetermined value, preferably 30 atmospheric pressure, or below, pressure sensor 220 generates pressure signal (PRESS) to then transmit the same to controller 250. Controller 250 having received pressure signal(PRESS) generates alarm signal (ALRAM) to operate alarm lamp 260, thereby alarming the driver and opening solenoid valve 230. Thus, the compressed gas is supplied to the inside of steering wheel 110 and steering column part 120, thereby maintaining the internal pressure to be a predetermined level.

As described above, the collapsible steering column apparatus of a vehicle according the present invention absorbs the shock applied when the driver strikes the steering wheel, thereby minimizing the shock, such that the distance between the driver and steering wheel is long at the time of the collision owing to the collapsible steering column part and the steering wheel is made soft.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of the patentable novelty that reside in the present invention, including all the features that would be treated as equivalents thereof by those skilled in the art to which this pertains.

What is claimed is:

1. A collapsible steering column apparatus of a motor vehicle, comprising:

a steering wheel having a hollow portion therein;

a steering column part including at least one steering column which is slidably moved lengthwise and having a gas filled therein, said steering wheel being fixed to said steering column part; and controlling means for supplying the gas to inside of said steering column part and said steering wheel, for maintaining an internal pressure of said steering column part and said steering wheel at a predetermined level, for alarming when the internal pressure is lowered below the predetermined level and exhausting the gas from the insides by detecting a collision of vehicle.

2. A collapsible steering column apparatus of a motor vehicle as claimed in claim 1, wherein said steering wheel is stiff enough to endure against about 30 atmospheric pressure when the hollow portion is filled with the gas and said steering wheel is comprised of a material which is elastic enough to be collapsible when the gas is exhausted.

3. A collapsible steering column apparatus of a motor vehicle as claimed in claim 1, wherein said steering column part comprises:

a first steering column whose both ends are opened, to an upper end of which said steering wheel is fixed, and having a first spline formed on a lower inner peripheral surface thereof and a first flange formed at a tip of the first spline;

a second steering column whose both ends are opened and having a second spline formed on the upper outer peripheral surface and slidably engaged with the first spline, a third spline formed in the lower inner peripheral surface, a fourth spline formed on the lower inner peripheral surface, and a third flange formed at the tips of the third and the fourth splines;

a third steering column whose one end is opened and having a fifth spline formed on the upper outer peripheral surface and slidably engaged with the third spline and a fourth flange formed in the tip of the fifth spline;

a fourth steering column whose one end is opened and having a sixth spline formed on the upper inner peripheral surface and slidably engaged with the fourth spline and a fifth flange formed at the tip of the sixth spline; and a bellows for sealing said first, second, third and fourth column by fixing an internal side of a first end thereof on the lower outer peripheral surface of said first steering column and an internal side of a second end thereof on the upper outer peripheral surface of said fourth steering column.

4. A collapsible steering column apparatus of a motor vehicle as claimed in claim 3, said steering column part further comprising:

a plurality of first balls inserted between the first spline of said first steering column and the second spline of said second steering column;

a plurality of second balls inserted between the third spline of said second steering column and the fifth spline of said third steering column; and a plurality of third balls inserted between the fourth spline of said second steering column and the sixth spline of said fourth steering column;

whereby a movement of said first steering column is restricted by the first balls, the first flange and third flange, and a movement of said second steering column is restricted by the second balls, the third balls, the third flange and the fourth flange.

5. A collapsible steering column apparatus of a motor vehicle as claimed in claim 3, said bellows is comprised of a material which has an allowable stress in the ranged of 30 PSI to 100 PSI.

6. A collapsible steering column apparatus of a motor vehicle as claimed in claim 1, said controlling means comprising:

a collision sensor installed in front of said motor vehicle for detecting a collision of said motor vehicle to generate a collision signal;

a pressure sensor installed in the inside of said steering column part for detecting the internal pressure of said steering column part to generate a pressure signal;

a reservoir for compressing and storing gas;

a first pipe whose one end is connected to said reservoir;

a second pipe whose one end is connected through said steering column part;

a solenoid valve whose first end is connected to said first pipe and whose second is connected to said second pipe for supplying the gas of said reservoir to the inside of said steering column part, for maintaining the internal pressure of said steering column part at a predetermined level, and for exhausting the gas in said steering column part in order to decrease the internal pressure thereof;

a controller for controlling said solenoid valve so as to exhaust the gas of said steering column part when the collision signal is received from said collision sensor, for controlling said solenoid valve so as to supply the gas in said reservoir to said steering column part simultaneously with generating a alarm signal by means of receiving said pressure signal from said pressure sensor when the pressure in said steering column part is lowered below the predetermined level, and for controlling said solenoid valve so as to maintain the pressure of said steering column part at the predetermined level by receiving the pressure signal from said pressure sensor when the pressure of said steering column part is reached at the predetermined level; and an alarm lamp for alarming a driver, said alarm lamp being operated by the alarm signal.

7. A collapsible steering column apparatus of a motor vehicle as claimed in claim 1, wherein the gas is air.

8. A collapsible steering column apparatus of a motor vehicle as claimed in claim 1, wherein the gas is nitrogen gas.

9. A collapsible steering column apparatus of a motor vehicle, comprising:

a steering wheel having a hollow portion therein, being comprised of a material which has an allowable stress in the ranged of 30 PSI to 100 PSI;

a first steering column having both ends being opened, an upper end to which said steering wheel is fixed, a first spline formed at the lower inner peripheral surface thereof and a first flange formed at a tip of the first spline;

a second steering column having both ends being opened, a second spline formed in upper outer peripheral surface and slidably engaged with the first spline, a third spline formed on lower inner peripheral surface, a fourth spline formed on lower outer peripheral surface, and a third flange formed at the tips of the third and fourth splines;

a third steering column having one end being opened, a fifth spline formed on upper outer peripheral surface and slidably engaged with the third spline, and a fourth flange formed at the tip of said fifth spline;

a fourth steering column having one end being opened, a sixth spline formed on upper inner peripheral surface and slidably engaged with the fourth spline, and a fifth flange formed at tip of the sixth spline;

a plurality of first balls inserted between the first spline of said first steering column and the second spline of said second steering column;

a plurality of second balls inserted between the third spline of said second steering column and the fifth spline of said third steering column;

a plurality of third balls inserted between the fourth spline of said second steering column and the sixth spline of said fourth steering column;

a bellows for sealing said first, second, third and fourth column by fixing an internal side of a first end thereof on the lower outer peripheral surface of said first steering column and an internal side of a second end thereof on the upper outer peripheral surface of said fourth steering column, and being comprised of a material endurable against at least about 30 atmospheric pressure;

a collision sensor installed in front of said motor vehicle for detecting a collision of said motor vehicle to generate a collision signal;

a pressure sensor installed in the inside of said steering column part for detecting the internal pressure of said first, second, third and fourth steering columns to generate a pressure signal;

a reservoir for compressing and storing the gas;

a first pipe whose one end is connected to said reservoir;

a second pipe whose one end is connected through said first and second steering columns;

a solenoid valve whose first end is connected to said first pipe and whose second end is connected to said second pipe for supplying the gas of said reservoir to the inside of said first, second, third and fourth steering columns, for maintaining the internal pressure of said first, second, third and fourth steering columns to a predetermined level, and for exhausting the gas in said first, second, third and fourth steering columns in order to decrease the internal pressure thereof;

a controller for controlling said solenoid valve so as to exhaust the gas of said first, second, third and fourth steering columns when the collision signal is received from said collision sensor, for controlling said solenoid valve so as to supply the gas in said reservoir to said first, second, third and fourth steering columns simultaneously with generating an alarm signal by receiving said pressure signal from said pressure sensor when the pressure in said steering column part is lowered below the predetermined level, and for controlling said solenoid valve so as to maintain the pressure of said first, second, third and fourth steering columns at the predetermined level by means of receiving the pressure signal from said pressure sensor when the pressure of said first, second, third and fourth steering columns is reached at the predetermined level; and an alarm lamp for alarming a driver, said alarm lamp being operated by the alarm signal;

whereby a movement of said first steering column is restricted by the first balls, the first flange and third flange, and movement of said second steering column is restricted by the second balls, the third balls, the third flange and the fourth flange.

* * * * *